United States Patent
Agapiou et al.

(10) Patent No.: US 12,451,768 B2
(45) Date of Patent: Oct. 21, 2025

(54) ROTATABLE STATOR SENSOR DEVICE

(71) Applicant: GM GLOBAL TECHNOLOGY OPERATIONS LLC, Detroit, MI (US)

(72) Inventors: John S. Agapiou, Rochester Hills, MI (US); Alexander Millerman, Bloomfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 273 days.

(21) Appl. No.: 18/454,408

(22) Filed: Aug. 23, 2023

(65) Prior Publication Data
US 2025/0070624 A1 Feb. 27, 2025

(51) Int. Cl.
| | |
|---|---|
| H02K 11/21 | (2016.01) |
| G01R 31/34 | (2020.01) |
| G01R 33/12 | (2006.01) |
| H02K 11/215 | (2016.01) |
| H02K 11/225 | (2016.01) |
| H02K 11/33 | (2016.01) |

(52) U.S. Cl.
CPC ......... *H02K 11/215* (2016.01); *H02K 11/225* (2016.01); *H02K 11/33* (2016.01)

(58) Field of Classification Search
CPC .... H02K 11/00; H02K 11/215; H02K 11/225; H02K 11/33; G01R 1/00; G01R 1/04; G01R 1/0408; G01R 1/0416; G01R 31/00; G01R 31/34; G01R 31/346; G01R 33/00; G01R 33/10; G01R 33/12; G01R 33/123; G01R 33/24; G01N 27/00; G01N 27/82; G01N 27/83; G01N 27/90; G01N 27/9006
See application file for complete search history.

(56) References Cited

U.S. PATENT DOCUMENTS

| | | | | |
|---|---|---|---|---|
| 6,489,781 | B1 * | 12/2002 | Kliman | ................. G01R 31/34 324/529 |
| 9,476,952 | B2 * | 10/2016 | Seo | ........................ H02K 11/20 |

(Continued)

FOREIGN PATENT DOCUMENTS

| | | |
|---|---|---|
| DE | 69914580 T2 | 12/2004 |
| DE | 60319885 T2 | 11/2008 |

(Continued)

OTHER PUBLICATIONS

U.S. Appl. No. 17/680,578, filed Feb. 25, 2022, Smith et al.

(Continued)

*Primary Examiner* — Tran N Nguyen

(57) ABSTRACT

A rotatable stator sensor device includes a stator support plate configured to support a steel stator having multiple teeth, a rotary table electrically isolated from the stator support plate, and at least two sensors on the rotary table. The at least two sensors are located within an inner circumference of the steel stator, each of the at least two sensors including two sensor legs, and a distance between the two sensor legs corresponds to a distance between two of the multiple teeth of the steel stator. The device includes a sensor rotation control module configured to rotate the at least two sensors between a first position aligned with a first set of the multiple teeth of the steel stator, and a second position aligned with a second set of the multiple teeth of the steel stator.

20 Claims, 6 Drawing Sheets

(56) References Cited

U.S. PATENT DOCUMENTS

2004/0124833 A1\* 7/2004 Kliman .................. G01R 31/34
324/241
2020/0368969 A1 11/2020 Wang et al.

FOREIGN PATENT DOCUMENTS

DE 102021133457 A1 6/2023
EP 3879290 A1 9/2021

OTHER PUBLICATIONS

U.S. Appl. No. 18/101,395, filed Jan. 25, 2023, Agapiou et al.
U.S. Appl. No. 18/310,780, filed May 2, 2023, Fatemi et al.
U.S. Appl. No. 18/312,029, filed May 4, 2023, Hao et al.
Office Action dated Apr. 10, 2024 from German Patent Office for German Patent No. 102023133463.8; 5pgs.

\* cited by examiner

ROTATABLE STATOR SENSOR DEVICE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to rotatable stator sensor devices, including sensors for measuring stator core loss and magnetic properties of oriented steel.

Electric vehicles are driven by one or more electric motors, which may include a steel stator. Properties of soft magnetic materials such as steel stators may be determined via global magnetic measurements. For example, a classical two windings technique, an Epstein frame, and a toroid transformer are standard measurement devices for measuring the magnetic properties of soft magnetic materials, especially for testing of electrical steels.

However, the magnetic properties of oriented steel are distinct in different directions, and knowledge of the magnetic properties of all the directions around the stator core is desirable in order to accurately design the machine. The above methods are used for non-oriented steel material and are not capable of identifying the characteristics of oriented steel material or defects within a stator core.

SUMMARY

A rotatable stator sensor device includes a stator support plate configured to support a steel stator having multiple teeth, a rotary table which is electrically isolated from the stator support plate, at least two sensors on the rotary table, the at least two sensors located within an inner circumference of the steel stator, each of the at least two sensors including two sensor legs, wherein a distance between the two sensor legs corresponds to a distance between two of the multiple teeth of the steel stator, and a sensor rotation control module configured to rotate the at least two sensors between a first position aligned with a first set of the multiple teeth of the steel stator, and a second position aligned with a second set of the multiple teeth of the steel stator, wherein the first set of the multiple teeth is different than the second set of the multiple teeth.

In other features, the rotatable stator sensor device includes an adjustable sensor holder on the stator support plate, wherein the adjustable sensor holder is configured to move the at least two sensors to a target position concentric with the inner circumference of the steel stator.

In other features, the stator support plate includes a groove corresponding to a circumference of the steel stator, and the groove is concentric to an axis of rotation of the rotary table.

In other features, the rotatable stator sensor device includes a shim positioned along the inner circumference of the steel stator between the at least two sensors and the multiple teeth of the steel stator.

In other features, a width of the shim is greater than or equal to a length of the steel stator. In other features, the two sensor legs of a first one of the at least two sensors extend in a direction 180 degrees opposite to a direction of the two sensors legs of a second one of the at least two sensors.

In other features, each sensor includes a stack of steel laminations. In other features, the rotatable stator sensor device includes at least one drive coil wound about a portion of one or more of the at least two sensors, and at least one pickup coil wound about a portion of one or more of the at least two sensors.

In other features, the sensor rotation control module is configured to obtain a first measurement of iron losses in a first section of the steel stator when the at least two sensors are in the first position, obtain a second measurement of iron losses in a second section of the steel stator when the at least two sensors are in the second position, and compare the first measurement and the second measurement to determine at least one magnetic property of the steel stator, the at least one magnetic property indicative of a defect in a lamination of the stator or a quality of the stator.

In other features, the sensor rotation control module is configured to rotate the at least two sensors to a third position aligned with a third set of the multiple teeth of the steel stator, the third set of the multiple teeth different than the first set of the multiple teeth and the second set of the multiple teeth, obtain a third measurement of iron losses in a third section of the steel stator when the at least two sensors are in the third position, and determine whether a stator defect is present according to the first measurement, the second measurement and the third measurement.

In other features, the sensor rotation control module is configured to obtain a first measurement of iron losses in a first section of the steel stator when the at least two sensors are in the first position, and compare the first measurement to a reference stator value to determine at least one magnetic property of the steel stator.

In other features, the distance between the two sensor legs of a first one of the at least two sensors is different than the distance between the two sensor legs of a second one of the at least two sensors.

A method for measuring magnetic properties of steel stator includes placing a steel stator having multiple teeth on a stator support plate, aligning at least two sensors with a first set of multiple teeth of the steel stator in a first position, each of the at least two sensors including two sensor legs, wherein a distance between the two sensor legs corresponds to a distance between two of the multiple teeth of the steel stator, and rotating the at least two sensors to a second position aligned with a second set of the multiple teeth of the steel stator. The at least two sensors are located on a rotary table within an inner circumference of the steel stator, the rotary table is electrically isolated from the stator support plate, and the first set of the multiple teeth is different than the second set of the multiple teeth.

In other features, the method includes moving the at least two sensors to a target position concentric with the inner circumference of the steel stator, using an adjustable sensor holder on the stator support plate.

In other features, the stator support plate includes a groove corresponding to a circumference of the steel stator, and the groove is concentric to an axis of rotation of the rotary table.

In other features, the method includes inserting a shim along the inner circumference of the steel stator between the at least two sensors and the multiple teeth of the steel stator.

In other features, a width of the shim is greater than or equal to a length of the steel stator. In other features, the two sensor legs of a first one of the at least two sensors extend in a direction 180 degrees opposite to a direction of the two sensors legs of a second one of the at least two sensors.

In other features, each sensor includes a stack of steel laminations. In other features, the method includes winding at least one drive coil about a portion of one or more of the at least two sensors, and winding at least one pickup coil wound about a portion of one or more of the at least two sensors.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
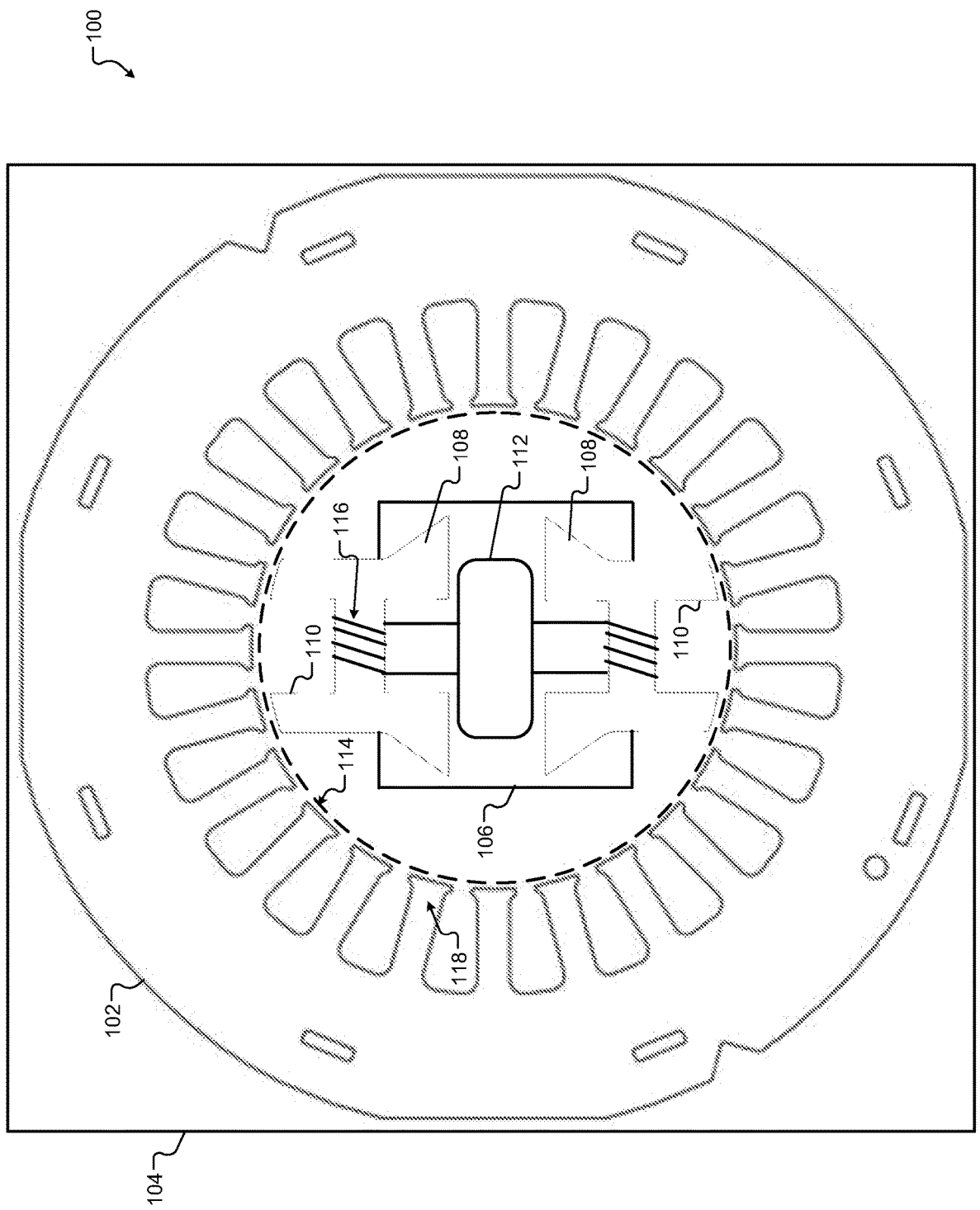
FIG. 1 is a diagram of an example rotatable stator sensor device for measuring magnetic properties of a stator.

Electric vehicles are driven by one or more electric motors, which may include a steel stator. Some example embodiments described herein include a rotatable electromagnetic sensor device to measure, e.g., electrical losses in stator lamination stacks.

The device is configured to measure the electrical losses in stator lamination stacks and the lamination material magnetic properties of oriented steel. The rotatable stator sensor device may facilitate distinguishing between stators made of different types of materials (e.g., oriented vs. non-oriented steel), different designs such as segmented stators, and may be employed to evaluate finished stator stacks prior to motor assembly. During the manufacturing process of a stator (such as a stator for an electric motor of an electric vehicle), there is often a desire to assess the quality of lamination stacks prior to full motor assembly in order to facilitate greater control over the quality of the finished products.

In various implementations, example stator sensor devices may facilitate measurement of stator core loss using a repeatable method for locating legs of two rotatable sensors in front of different sets of stator teeth, with a very narrow air gap. Lamination stack core loss inspection may identify possible variations at each stator core manufacturing process step due to mechanical stress, which can cause deterioration of magnetic performance of the stator.

In some example embodiments, a rotatable stator sensor device may determine the magnetic properties of oriented steel at different directions, since the knowledge of the magnetic properties of the stator in multiple directions is desirable to accurately design the machine. Two or three sensors (or more) with different angular openings may be implemented when evaluating the iron loss of oriented steel of a stator.

The device may identify lamination stack defects in the stator that occur through the manufacturing of the individual laminations in a progressive die. The sensors may be arranged in an apparatus that includes a support plate for the stator core, and two sensors (or more or less) supported on an axis of a rotary table. The rotary table is configured to index the sensors in relation to the teeth in the stator core. An adjustable adapter for the sensors may control concentricity and an air gap distance, for aligning the sensors to the teeth of the core.

In some example embodiments, a stator core made from non-oriented or oriented steel material is located on a top plate of the device and clamped. The top plate may have a concentric groove to locate the stator concentric to the axis of rotation. The rotary table is aligned close to the center of the groove in the top plate.

Two sensors, including the corresponding sensor limbs, are made using high quality non-oriented steel to minimize their iron losses. In various implementations, the thickness (e.g., height) of each sensor may be equal or 1 mm taller than the stator core (or greater or lesser thicknesses). The sensor legs may be about 8 to 10 mm wide (or wider or narrower), and the tip of each sensor leg may have a chamfer such that its contact length with the stator tooth is equal.

The width of the sensor legs at the tip may be a function or the width of the stator tooth at the tip. The curvature of the sensor legs at the tip may be the same as the circumference of the stator inner diameter. In various implementations, various sections of the sensors may be shaped to interlock with a plastic adapter holder. The angular opening between the two legs of the sensor may be designed to capture a certain number of teeth in the stator to measure the iron loss across a section of the stator between the number of teeth.

In some example embodiments, two sensors are located within the stator inside diameter (ID) using a center arbor that is isolated from the stator and the main body of the device. The two sensors are located about 180 degrees apart to cancel the electromotive forces generated by the magnetic field when the sensors are sensing stator magnetic properties or being rotated. A two sensor arrangement may be used for testing to avoid flux leakage through the back iron, and to counteract the electromotive forces.

In various implementations, an adapter holds the two sensors concentric to the stator ID. The adapter provides alignment details for the sensors to control their concentricity to the stator ID, and to control the air gap between the sensor legs and the stator teeth. A plastic shim may be used in the perimeter (e.g., circumference) of the inner diameter of the stator, to control the air gap between the stator teeth and the sensor legs and avoid any contact of the stator teeth with the sensor legs.

A rotary table under the top plate may be used to align the sensor legs to the teeth of the stator, in several positions with respect to the stator teeth. By rotating the sensor legs, the iron loss can be measured at several positions (e.g., at specified intervals) for a range of stator teeth. The sensors may be rotated at several intervals to cover the a full inside circumference of the stator (or a portion of the full inside circumference), to evaluate the consistency of iron loss in different locations and identify possible defects in the stator.

In some example embodiments, special fixtures may be used to setup and hold the sensors for calibration. The fixtures are designed to locate the two sensors in opposite directions with the sensor limbs across from one another, and restrain the electromotive forces generated by the magnetic field (e.g., flux densities) during the calibration process. The calibration fixture may provide side adjustments for aligning the limbs of the two sensors.

FIG. 1 is a diagram of an example rotatable stator sensor device 100 for measuring magnetic properties of a stator. As shown in FIG. 1, the rotatable stator sensor device 100 includes a stator support plate 104. The stator support plate 104 is configured to support a steel stator 102 having multiple teeth 118. In various implementations, the steel stator 102 may be a stator for an electric motor of an electric vehicle or hybrid vehicle.

The rotatable stator sensor device 100 includes a rotary table 106. The rotary table 106 is electrically isolated from the stator support plate 104. At least two sensors 108 are on the rotary table 106. Although FIG. 1 illustrates two sensors 108, other embodiments may include more or less sensors, or sensors arranged in a different configuration.

The sensors 108 are located within an inner diameter of the steel stator 102. For example, each sensor 108 includes two sensor legs 110, and each sensor 108 may be positioned such that each sensor leg 110 is located adjacent an inner circumference surface of one of the teeth 118 of the steel stator 102.

In some example embodiments, a distance between the two sensor legs 110 of a sensor 108 may correspond to a distance between two of the teeth 118 of the steel stator 102. For example, two sensor legs 110 may correspond to a span of two teeth 118, to a span of three teeth 118, to a span of four or more teeth 118, etc.

The rotatable stator sensor device 100 includes a sensor rotation control module 112 configured to rotate the sensors 108 between a first position aligned with a first set of the teeth 118 of the steel stator 102, and a second position aligned with a second set of the teeth 118 of the steel stator 102.

Figure 2:
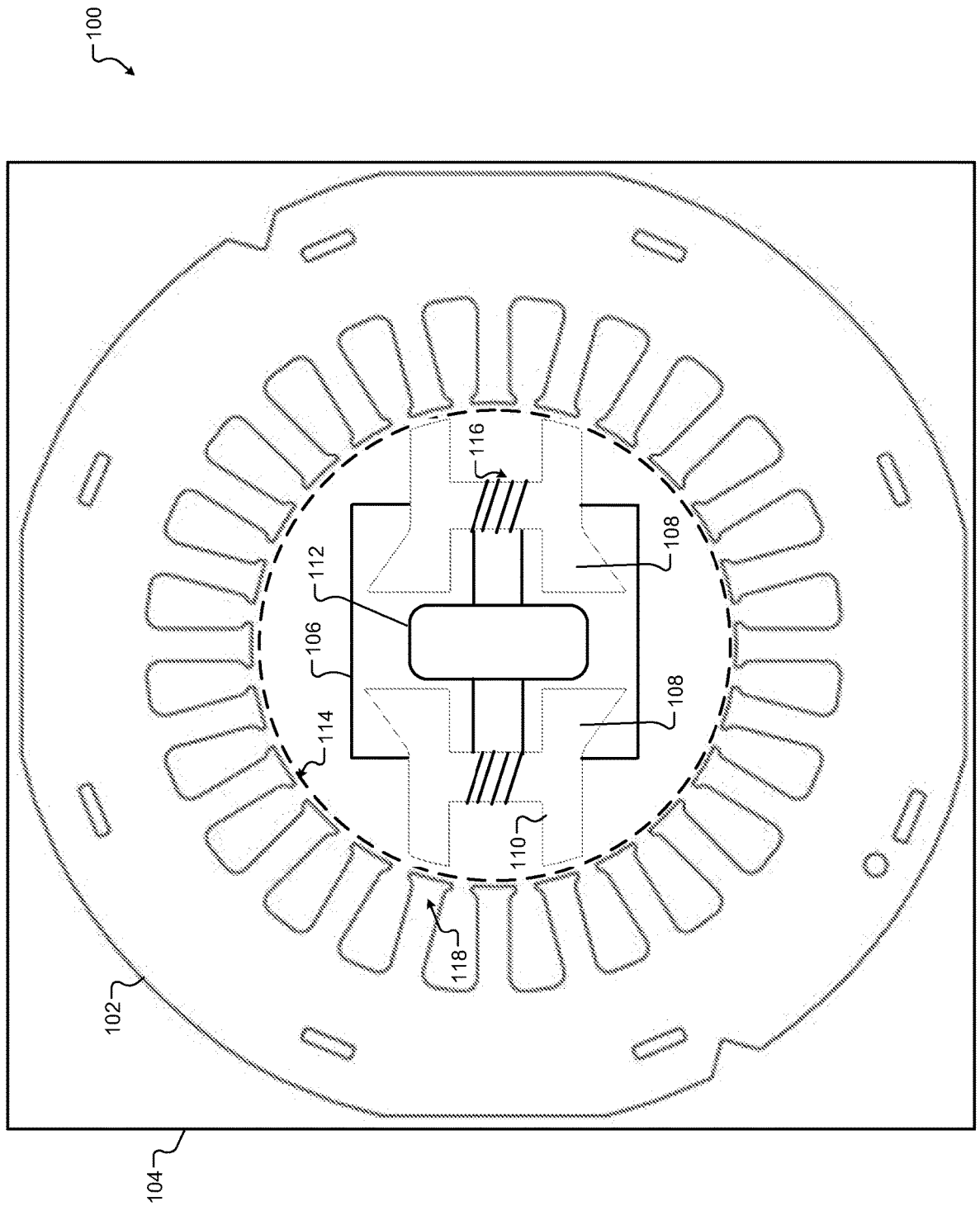
FIG. 2 is a diagram of the rotatable stator sensor device of FIG. 1 with sensors rotated to a different position.

For example, FIG. 1 illustrates the sensors 108 in a first position, with the sensor legs 110 adjacent first sets of the teeth 118 of the steel stator. FIG. 2 illustrates a second position where the sensors 108 have been rotated ninety degrees with respect to the steel stator 102. In various implementations, the sensor rotation control module may control rotation of the rotary table 106, to move the sensors 108 between different positions. Each different position may align the sensor legs 110 of the sensors 108 with different sets of teeth 118 of the steel stator.

In some example embodiments, the rotatable stator sensor device 100 may include an adjustable sensor holder on the stator support plate 104. The adjustable sensor holder may be coupled with the sensors 108, to move a position of the sensors 108 with respect to the steel stator 102. For example, the adjustable sensor holder may be configured to move the sensors 108 so they are concentric with an inner circumference of the steel stator 102 (e.g., such that an axis of rotation of the sensors 108 or the rotary table 106 is concentric with the inner circumference of the steel stator 102). This may allow the sensor legs 110 to move along the inner circumference of the teeth 118 of the steel stator 102, without varying a width of an air gap between the sensor legs 110 and the teeth 118 at different rotation positions of the sensors 108.

In some example embodiments, the stator support plate 104 includes a groove for positioning the steel stator 102. The groove may have a size corresponding to a circumference of the steel stator 102, and the groove may be concentric to an axis of rotation of the rotary table 106 and the sensors 108. In various implementations, one or more clamps may be positioned on the stator support plate 104 to clamp the steel stator 102 in place (e.g., after it is aligned in the groove of the stator support plate 104).

An optional shim 114 may be positioned along the inner circumference of the steel stator 102, between the sensors 108 and the teeth 118 of the steel stator 102. The shim 114 may include plastic or another suitable material, which can reduce friction as the ends of the sensor legs 110 move along the inner circumference surface of the teeth 118. The shim 114 may facilitate maintaining a desired air gap between the sensor legs 110 and the teeth 118. A width of the shim 114 may be greater than or equal to a length of the steel stator 102, to provide electrical isolation by inhibiting or preventing the sensor legs 110 from contacting the teeth 118.

As shown in FIG. 1, the two sensor legs 110 of one of the sensors 108 extend in a direction 180 degrees opposite to a direction of the two sensors legs 110 of the other sensor 108. This arrangement may balance electrical forces as the sensors 108 are rotated to take measurements of the steel stator 102. Each sensor 108 may include any suitable materials for sensing magnetic properties of portions of the steel stator 102, such as a stack of steel laminations.

The rotatable stator sensor device 100 includes coils 116 wound about portions of the sensors 108. The coils 116 may include wires wrapped around a center of the sensors 108, wrapped around a sensor leg 110, wrapped around other portions of the sensors 108, etc.

Each coil 116 may be configured to operate as a drive coil or a pickup coil for obtaining measurements from the steel stator 102. For example, the coils 116 may be coupled with the sensor rotation control module 112 (or another control module), where the sensor rotation control module 112 is configured to supply a drive signal to a coil 116 operating as a drive coil, and receive a signal from another coil 116 operating as a pickup coil, in order to obtain a measurement of a magnetic property of a section of the steel stator 102 (e.g., a section of the steel stator 102 between teeth 118 adjacent to sensor legs 110 of a sensor 108).

In some example embodiments, the rotatable stator sensor device 100 may be configured to obtain a first measurement of iron losses in a first section of the steel stator 102 when the sensors 108 are in the first position (e.g., the position illustrated in FIG. 1), and obtain a second measurement of iron losses in a second section of the steel stator 102 when the sensors 108 are in the second position (e.g., the rotated position illustrated in FIG. 2). The sensor rotation control module 112 may be configured to compare the first measurement and the second measurement to determine at least one magnetic property of the steel stator 102.

In various implementations, the sensor rotation control module 112 is configured to rotate the sensors 108 to a third position aligned with a third set of the teeth 118 of the steel stator 102, and obtain a third measurement of iron losses in a third section of the steel stator 102. This process may be repeated by rotating the sensors 108 and taking measurements at as many positions as desired.

The sensor rotation control module 112 may be configured to determine whether a stator defect is present according to the various measurements. For example, in various implementations the sensor rotation control module 112 may be configured to compare one or more measurements to a reference stator value to determine at least one magnetic property of the steel stator 102.

Although FIG. 1 illustrates the distance between the sensor legs 110 as being the same for both sensors 108, in other example embodiments the distance between the two sensor legs 110 may be different for each sensor. For example, sensors 108 having various distances between the sensor legs 110 may be calibrated, and selectively placed on the rotary table 106 based on a spacing of the teeth 118 for a specific steel stator 102.

Figure 3:
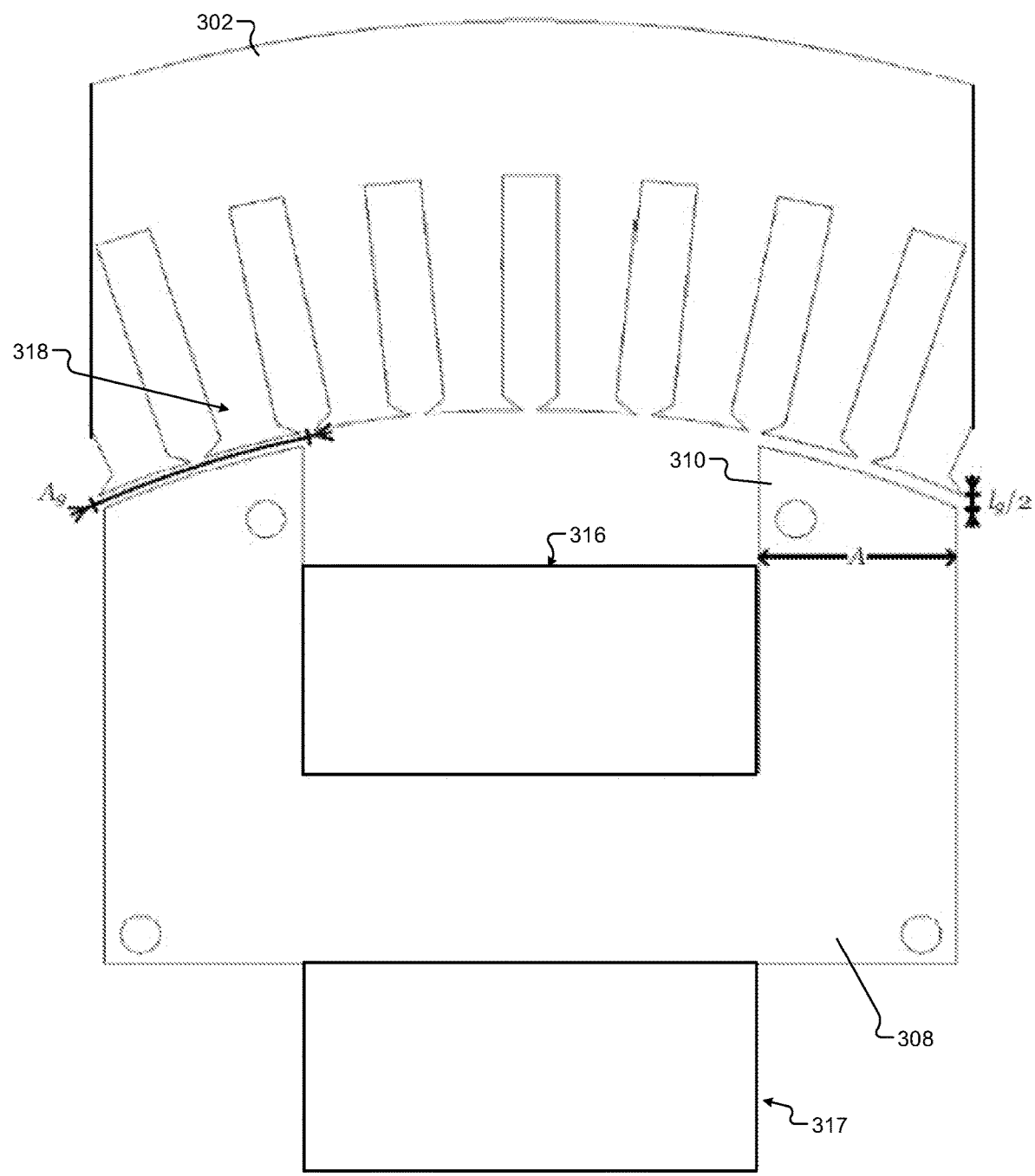
FIG. 3 is diagram illustrating example alignment of a stator sensor with teeth of the stator.

FIG. 3 is diagram illustrating example alignment of a stator sensor 308 with teeth 318 of the stator 302. The stator 302 may have any suitable stator design, such as a circular stator with teeth 318 extending inwards from the back-iron of the stator 302.

As shown in FIG. 3, a width A of one of the sensor legs 310 may correspond to a width Ag of two teeth 318 of the stator 302. In other example embodiments, the width of the sensor legs 310 may correspond to a width of one of the teeth 318, to a width of more than two of the teeth 318, etc.

A curvature of ends of the sensor legs 310 may correspond to an inner circumference of the teeth 318. This facilitates rotation of the sensor 308 along the inner circumference of the teeth 318, while maintaining an air gap distance Ig/2 between the end of the sensor legs 310 and the sensor teeth 318.

The sensor 308 may include any suitable construction, including a stack of steel laminations. A drive coil 317 and a pickup coil 316 may be wound around different portions of the sensor 308 in order to measure magnetic properties of sections of the stator 302.

Figure 4:
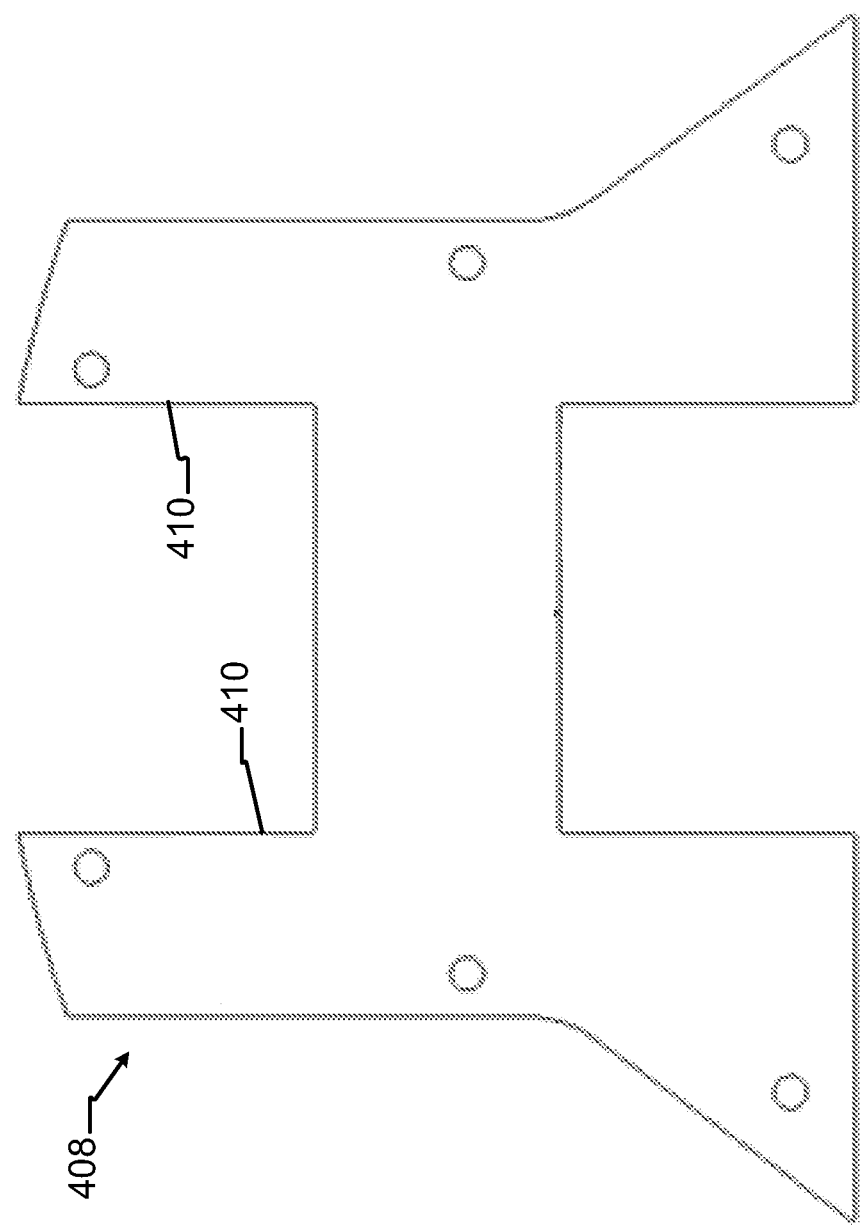
FIG. 4 is a diagram illustrating example dimensions of a sensor of the rotatable stator sensor device of FIG. 1.

FIG. 4 is a diagram illustrating example dimensions of a sensor 308 of the rotatable stator sensor device 100 of FIG. 1. The example dimensions of the sensor 408 and the sensor legs 410 in FIG. 4 are for purposes of illustration only, and other example embodiments may include sensors with different dimensions.

Figure 5:
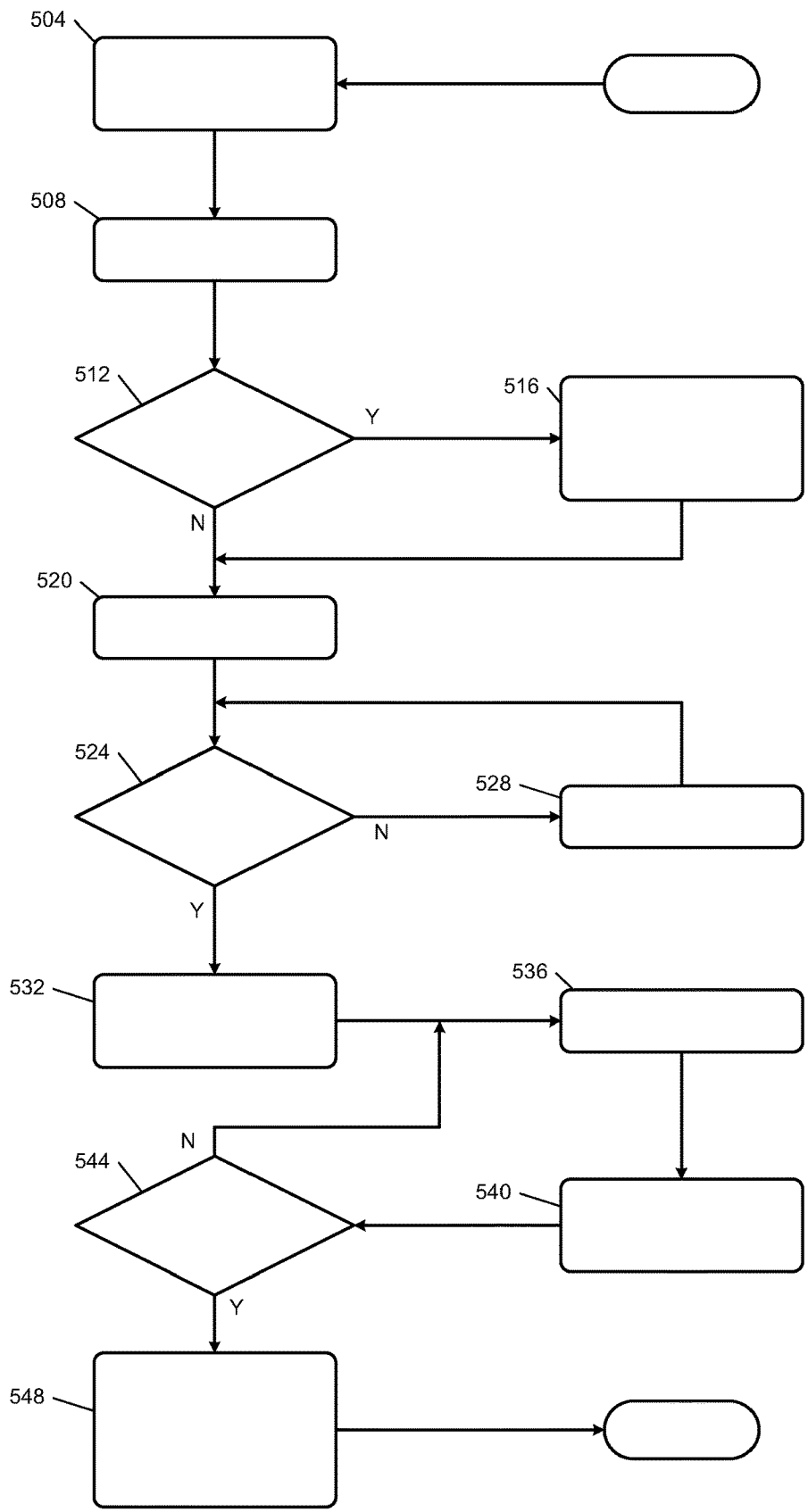
FIG. 5 is a flowchart depicting an example process for using a rotatable stator sensor device to measure magnetic properties of a stator.

FIG. 5 is a flowchart depicting an example process for using a rotatable stator sensor device to measure magnetic properties of a stator. At 504, the process begins by setting a stator in a locating groove of a stator support plate. Optional clamps engage the stator to fix the stator to the support plate at 508.

If an optional insulation sheet will be used at 512 (e.g., a plastic shim or other electrically isolating material), the process proceeds to 516 to insert the insulation sheet along an inner circumference of the stator teeth.

After inserting the insulation sheet, or determining that an optional insulation sheet will not be used, the process proceeds to 520 to place sensors on the rotary table (if the sensor are not already present on the rotary table). If the sensors are not concentric to the stator at 524, the process proceeds to 528 to adjust incremental sensor positioning.

Once the sensors are concentric to the stator at 524, the process proceeds to 532 to test stator electrical (e.g., magnetic) properties at a first position with respect to teeth of the stator. The sensors are then rotated to a next position with respect to different teeth of the stator at 536.

At 540, the process includes testing stator magnetic (e.g., electrical) parameters at the next position with respect to the teeth of the stator. If there are more positions specified for testing at 544, the process returns to 536 to rotate the sensors to the next position for another measurement of stator magnetic parameters. Once all specified positions have been tested at 544, the process proceeds to 548 to compare the measurements in order to identify magnetic properties of the stator, such as iron losses, and whether or not the stator is defective.

In some example embodiments, a process may include setting a stator on top of a fixture within a locating groove in, e.g., a Delrin plate. A dowel may be aligned with the stator slot on the outer diameter of the stator, and clamps may be engaged on the fixture to clamp the stator in place.

A plastic sheet/shim may be inserted along an inner circumference of the teeth of the stator. If the sensors are not already setup, the sensors are inserted onto a rotation shaft and alignment dowel. A control program may define various locations of the sensor(s) for measurements.

For example, a sensor control program may facilitate use of incremental positioning buttons to move the sensors to make sure they are concentric to the stator ID. If there is a concern with alignment, the clamps may be loosened to make adjustments in the sensor holder to correct the radial location of the sensors. A master ring fixture may be used to properly align the sensor to the rotary axis.

For example, incremental and absolute positioning buttons may be used to move the sensors to the desired position if there is misalignment of the stator tooth to the sensor leg. The zero position may then be set in the motor control program, and testing of the stator using the sensors may proceed.

Figure 6:
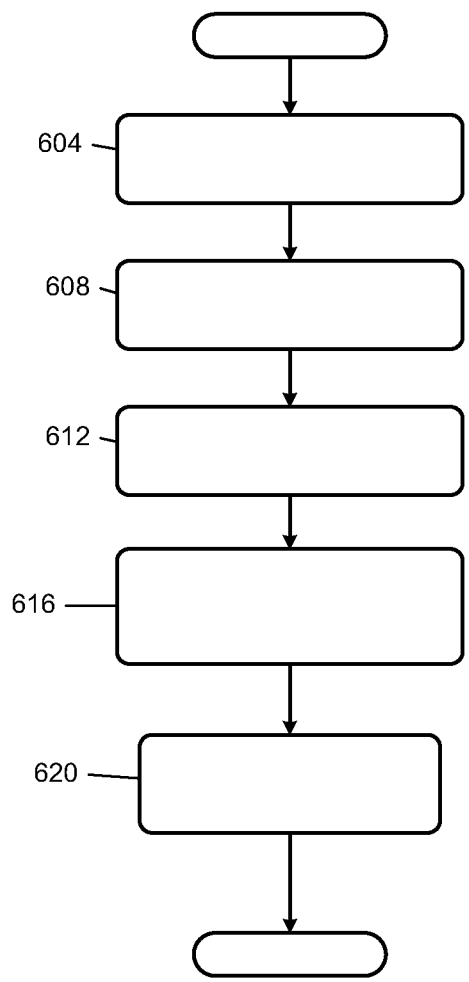
FIG. 6 is a flowchart depicting an example process for manufacturing a sensor of the rotatable stator sensor device of FIG. 1.

FIG. 6 is a flowchart depicting an example process for manufacturing a sensor of the rotatable stator sensor device of FIG. 1. At 604, the process begins by preparing steel laminations for a sensor. At 608, the core is bonded with an adhesive.

Each steel lamination is roller coated at 612. Next, the steel laminations are stacked in the form of the sensor, and then the stacked steel laminations are cured. In various implementations, the sensor may be dried at a specified temperature to complete manufacture of the sensor.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A rotatable stator sensor device comprising:
a stator support plate configured to support a steel stator having multiple teeth;
a rotary table which is electrically isolated from the stator support plate;
at least two sensors on the rotary table, the at least two sensors located within an inner circumference of the steel stator, each of the at least two sensors including two sensor legs, wherein a distance between the two sensor legs corresponds to a distance between two of the multiple teeth of the steel stator; and
a sensor rotation control module configured to rotate the at least two sensors between a first position aligned with a first set of the multiple teeth of the steel stator, and a second position aligned with a second set of the multiple teeth of the steel stator, wherein the first set of the multiple teeth is different than the second set of the multiple teeth.

2. The rotatable stator sensor device of claim 1, further comprising an adjustable sensor holder on the stator support plate,
wherein the adjustable sensor holder is configured to move the at least two sensors to a target position concentric with the inner circumference of the steel stator.

3. The rotatable stator sensor device of claim 1, wherein:
the stator support plate includes a groove corresponding to a circumference of the steel stator; and
the groove is concentric to an axis of rotation of the rotary table.

4. The rotatable stator sensor device of claim 1, further comprising a shim positioned along the inner circumference of the steel stator between the at least two sensors and the multiple teeth of the steel stator.

5. The rotatable stator sensor device of claim 4, wherein a width of the shim is greater than or equal to a length of the steel stator.

6. The rotatable stator sensor device of claim 1, wherein the two sensor legs of a first one of the at least two sensors extend in a direction 180 degrees opposite to a direction of the two sensors legs of a second one of the at least two sensors.

7. The rotatable stator sensor device of claim 1, wherein each sensor includes a stack of steel laminations.

8. The rotatable stator sensor device of claim 1, further comprising:
    at least one drive coil wound about a portion of one or more of the at least two sensors; and
    at least one pickup coil wound about a portion of one or more of the at least two sensors.

9. The rotatable stator sensor device of claim 1, wherein the sensor rotation control module is configured to:
    obtain a first measurement of iron losses in a first section of the steel stator when the at least two sensors are in the first position;
    obtain a second measurement of iron losses in a second section of the steel stator when the at least two sensors are in the second position; and
    compare the first measurement and the second measurement to determine at least one magnetic property of the steel stator, the at least one magnetic property indicative of a defect in a lamination of the stator or a quality of the stator.

10. The rotatable stator sensor device of claim 9, wherein the sensor rotation control module is configured to:
    rotate the at least two sensors to a third position aligned with a third set of the multiple teeth of the steel stator, the third set of the multiple teeth different than the first set of the multiple teeth and the second set of the multiple teeth;
    obtain a third measurement of iron losses in a third section of the steel stator when the at least two sensors are in the third position; and
    determine whether a stator defect is present according to the first measurement, the second measurement and the third measurement.

11. The rotatable stator sensor device of claim 1, wherein the sensor rotation control module is configured to:
    obtain a first measurement of iron losses in a first section of the steel stator when the at least two sensors are in the first position; and
    compare the first measurement to a reference stator value to determine at least one magnetic property of the steel stator.

12. The rotatable stator sensor device of claim 1, wherein the distance between the two sensor legs of a first one of the at least two sensors is different than the distance between the two sensor legs of a second one of the at least two sensors.

13. A method for measuring magnetic properties of steel stator, the method comprising:
    placing a steel stator having multiple teeth on a stator support plate;
    aligning at least two sensors with a first set of multiple teeth of the steel stator in a first position, each of the at least two sensors including two sensor legs, wherein a distance between the two sensor legs corresponds to a distance between two of the multiple teeth of the steel stator; and
    rotating the at least two sensors to a second position aligned with a second set of the multiple teeth of the steel stator, wherein,
        the at least two sensors are located on a rotary table within an inner circumference of the steel stator,
        the rotary table is electrically isolated from the stator support plate, and
        the first set of the multiple teeth is different than the second set of the multiple teeth.

14. The method of claim 13, further comprising moving the at least two sensors to a target position concentric with the inner circumference of the steel stator, using an adjustable sensor holder on the stator support plate.

15. The method of claim 13, wherein:
    the stator support plate includes a groove corresponding to a circumference of the steel stator; and
    the groove is concentric to an axis of rotation of the rotary table.

16. The method of claim 13, further comprising inserting a shim along the inner circumference of the steel stator between the at least two sensors and the multiple teeth of the steel stator.

17. The method of claim 16, wherein a width of the shim is greater than or equal to a length of the steel stator.

18. The method of claim 13, wherein the two sensor legs of a first one of the at least two sensors extend in a direction 180 degrees opposite to a direction of the two sensors legs of a second one of the at least two sensors.

19. The method of claim 13, wherein each sensor includes a stack of steel laminations.

20. The method of claim 13, further comprising:
    winding at least one drive coil about a portion of one or more of the at least two sensors; and
    winding at least one pickup coil wound about a portion of one or more of the at least two sensors.

* * * * *